United States Patent
Ogura

[11] 3,936,153
[45] Feb. 3, 1976

[54] RETROFOCUS TYPE OBJECTIVE LENS SYSTEM

[75] Inventor: Toshinobu Ogura, Tondabayashi, Japan

[73] Assignee: Minolta Camera Kabushiki Kaisha, Osaka, Japan

[22] Filed: Mar. 11, 1974

[21] Appl. No.: 450,249

[30] Foreign Application Priority Data
Mar. 12, 1973 Japan................. 48-27978

[52] U.S. Cl. .............................................. 350/216
[51] Int. Cl.² ........................................... G02B 9/60
[58] Field of Search ................................... 350/216

[56] References Cited
UNITED STATES PATENTS
3,731,989  5/1973  Shimizu ................. 350/216

Primary Examiner—John K. Corbin
Attorney, Agent, or Firm—Wolder & Gross

[57] ABSTRACT

A retrofocus type objective lens system consists of five lenses, from the object side, a front first lens, a biconvex second lens, a biconcave third lens, a positive meniscus fourth lens having a rear convex surface, and a positive fifth lens, the system satisfying the following conditions:

a. $d_4 > d_5 + d_6 + d_7 + d_8 + d_9$
b. $0.7 d_4 < d_2 < 1.3 d_4$
c. $-0.5 < r_3/r_4 < -0.1$
d. $N_1 < N_3$
e. $d_2 > 0.2f$ wherein $r_j$ is the radius of curvature of the jth lens surface, designated sequentially from the object side; $d_j$ is the axial distance between the jth and the j+1 lens surfaces; $N_i$ is the refractive index of the ith lens; and $f$ is the focal length of the entire lens system.

3 Claims, 7 Drawing Figures

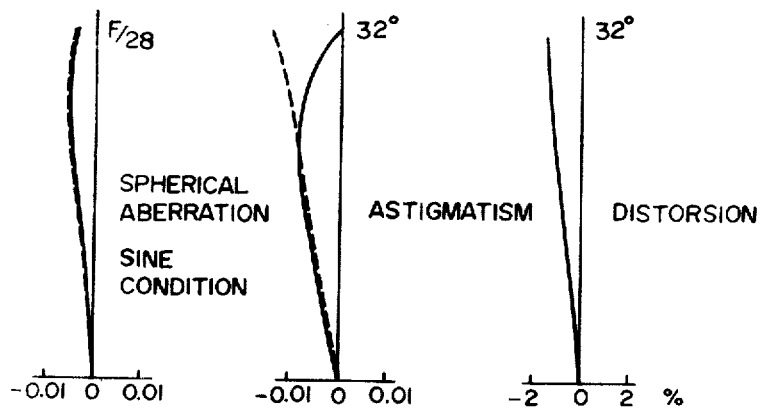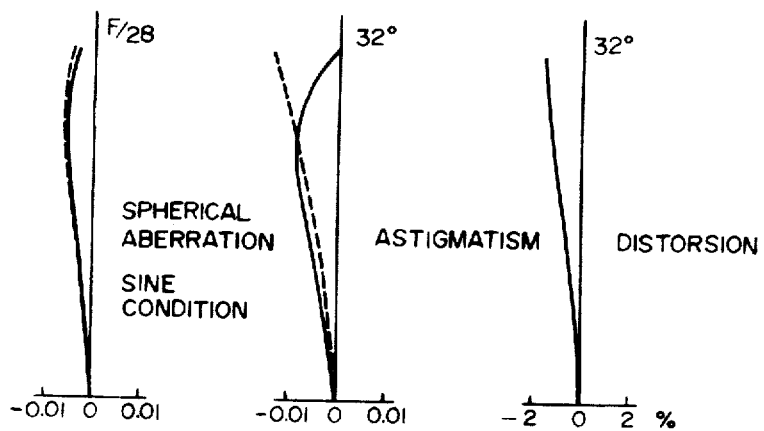

3,936,153

RETROFOCUS TYPE OBJECTIVE LENS SYSTEM

BACKGROUND OF THE INVENTION

The present invention relates generally to a retrofocus type objective lens system, and more particularly to a retrofocus type objective lens system for use in a single lens reflex camera having a backfocus longer than 0.9 times the focal length of the entire lens system.

A known retrofocus type lens for use in a single reflex camera incorporates a divergent lens ahead of the entire lens system and a convergent lens in the rear half portion thereof overcoming the divergency of the aforesaid lens system, for the purpose of obtaining a long backfocus. An attempt to achieve better compensation for the aberration of the entire lens system results in a complicated construction of the lenses. The objective lenses of the retrofocus type of this kind consists of five lenses and are known as the simplest construction of lenses, i.e., consisting from the object side, a first negative lens, a second positive lens, a third negative lens, a fourth positive lens and a fifth positive lens.

According to the present invention, there is provided a small size and light weight objective lens system having an image forming capability at least equal to or better than that of the conventional retrofocus type lens system which consists of six or seven lenses, by providing an improved lens arrangement and dimensional relationship of the retrofocus type lens system consisting of five components defining five lenses.

OBJECT OF THE INVENTION

It is an object of the present invention to provide a retrofocus type objective lens system whose backfocus is longer than 0.9 times as long as the focal length (f) of the entire lens system and in which aberration is well compensated, said system consisting of five components defining five lenses.

It is another object of the invention to provide a retrofocus type objective lens system whose backfocus is longer than 0.9 times as long as the focal length of the entire lens system and which is adapted for use as an interchangeable lens in a single reflex camera having a field angle of over 64° and being light in weight, said system consisting of five components, five lenses.

These and other objects and features of the present invention will be apparent from the reading of the following description in conjunction with the accompanying drawings, which set forth embodiments of the invention.

SUMMARY OF THE INVENTION

It has been found that the above and related objects of the invention may be readily attained in a retrofocus type objective lens system of five groups, five lenses consisting, from the object side, of a negative meniscus first lens having a convex surface facing the front or object side, a second lens having convex surfaces on both sides, a third lens having concave surfaces on both sides, a positive meniscus fourth lens having a convex surface facing the rear or image side and a fifth positive lens, said system satisfying the following conditions:

a. $d_4 > d_5 + d_6 + d_7 + d_8 + d_9$
b. $0.7 d_4 < d_3 < 1.3 d_4$
c. $-0.5 < r3/r4 < -0.1$
d. $N_1 < N_3$
e. $d_2 > 0.2f$ wherein $r1, r2, r3, r4 \ldots r10$ are the radii of curvatures of the lens refracting surfaces arranged sequentially from the object side; $d_1, d_2 \ldots d_9$ are the axial lengths between the refracting surfaces arranged sequentially from the object side; $N_1, N_2 \ldots N_5$ are the refractive indexes of the lenses arranged sequentially from the object side; and $f$ is focal length of the entire lens system.

Since the objective lens system according to the present invention is of a retrofocus type, it is required that a divergent lens be disposed at the forward side of the lens system. According to the present invention, a single negative first lens placed closest to the object side is used as the aforesaid divergent lens, while a biconvex second lens follows this single meniscus negative lens and possesses an axial position and configuration as defined in the conditions (a), (b), (c), thereby providing a retrofocus type objective lens system having the least number of lenses, yet possessing effective aberration compensation.

More particularly, following the condition (a) the biconvex second lens is placed at a considerably greater air distance $d4$ apart from the lenses subsequent to the third lens inclusive, while the second lens is located somewhat ahead of the center of the entire lens system and has a relatively greater thickness as defined in the condition (b), thereby functioning to effectively compensate for coma aberration, distortion aberration and lateral chromatic aberration which are created by the first lens.

In addition to the aforesaid feature, the condition (c) permits proper compensation for coma aberration by means of the second lens and the minimization of spherical aberration a highly satisfactory degree, while the condition (d) provides a small Petzval sum and good image surface characteristic, while preventing the development of a halo component for improving the image contrast. Furthermore, the condition (e) presents a backfocus longer than 0.9 times the focal length of the entire lens system.

BRIEF DESCRIPTION OF THE DRAWINGS

FIG. 2a, 2b and 2c are graphs illustrating the aberration characteristics of a specific example of the lens system of FIG. 1; and FIGS. 3a, 3b and 3c are graphs similar to those of FIGS. 2a, 2b and 2c of another specific example of the lens system.

DESCRIPTION OF THE INVENTION

Figure 1:
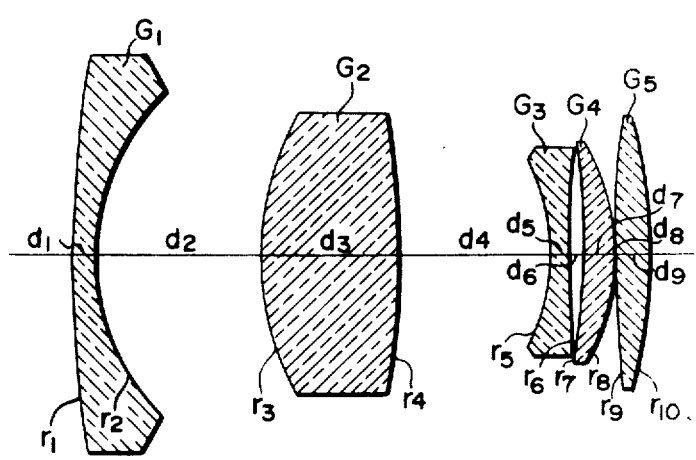
FIG. 1 is a longitudinal medial sectional view of a retrofocus lens system embodying the present invention.

Referring now to FIG. 1, the improved retrofocus type objective lens system consists of five consecutively designated lenses; a front or object side first lens $G_1$ which is a negative meniscus lens with a rear concave face, a biconvex second lens $G_2$, a biconcave third lens $G_3$, a positive meniscus fourth lens $G_4$ with a rear convex face and a positive fifth lens $G_5$. The following Table 1 sets forth the specific dimensions and parameters of a lens system embodying the present invention in which $r_j$ is the radius of curvature of the $j$th lens surface which surfaces are successively designated from the front to the rear; $d_j$ is the axial distance between the $j$th lens surface and the $j+1$ surface, $N_i$ is the refractive index of the ith lens; and $V_i$ is the Abbe's number of the ith lens, the values of $r_j$ and $d_j$ being based on the focal length $f$ of the lens system being equal to 1:

TABLE I

| f = 1.0 1:2.8 radius of curvature | field angle 2ω = 64° length on axis | backfocus s' = 1.06 refractive index | Abbe's number |
|---|---|---|---|
| r1 = 2.3437 | d1 = 0.0441 | N1 = 1.5714 | v1 = 53.0 |
| r2 = 0.4709 | d2 = 0.3538 | | |
| r3 = 0.6206 | d3 = 0.28 | N2 = 1.6583 | v2 = 58.5 |
| r4 = −1.8643 | d4 = 0.3182 | | |
| r5 = −0.4012 | d5 = 0.0379 | N3 = 1.6889 | v3 = 31.2 |
| r6 = 2.3930 | d6 = 0.0283 | | |
| r7 = −1.4595 | d7 = 0.067 | N4 = 1.7200 | v4 = 50.3 |
| r8 = −0.4496 | d8 = 0.0029 | | |
| r9 = 2.4019 | d9 = 0.068 | N5 = 1.6204 | v5 = 60.3 |
| r10 = −1.1931 | | | |

In the aforesaid specific embodiment, $d_4 = 0.3182$
$d_5 + d_6 + d_7 + d_8 + d_9 = 0.0379 + 0.0283 + 0.067 + 0.0029 + 0.068$ $d_5 + d_6 + d_7 + d_8 + d_9 = 0.2041$ thus satisfying the condition (a) $d_4 > d_5 + d_6 + d_7 + d_8 + d_9$. In addition, $d_3 = 0.28$, $d_4 = 0.3182$.

$d_3/d_4 = 1.136$ thus satisfying the condition (b) $0.7d_4 < d_3 < 1.3d_4$ Furthermore, $r_3/r_4 = 0.6206/-1.8643 \approx -0.333$ thus satisfying the condition
(c) $-0.5 < r_3/r_4 < -0.1$
$N_1 = 1.5714 < N_3 = 1.6583$ thus satisfying the conditions that $N_1 < N_3$ Furthermore, $d_2 = 0.3538 > 0.2$ thus satisfying the condition that $d_2 > 0.2f$.

Seidel's coefficient at each refracting surface in the objective lens system of the aforesaid first embodiment as specified in Table I are set forth in the following Table II:

TABLE II

| surface | spherical aberration | coma | astigmatism | Petzval sum | distortion |
|---|---|---|---|---|---|
| 1 | 0.0179 | 0.0328 | 0.0601 | 0.1551 | 0.3940 |
| 2 | −9.9235 | 1.5625 | −0.2463 | −0.7721 | 0.1604 |
| 3 | 14.5162 | 0.3321 | 0.0076 | 0.6397 | 0.0148 |
| 4 | 2.2703 | −1.4168 | 0.8842 | 0.2129 | −0.6847 |
| 5 | −12.48240 | 2.0868 | −0.3488 | −1.0167 | 0.2283 |
| 6 | −1.67585 | −1.4327 | −1.2249 | −0.1704 | −1.1930 |
| 7 | 0.0690 | 0.2028 | 0.5957 | −0.2868 | 0.9074 |
| 8 | 4.9718 | −0.6484 | 0.0845 | 0.9311 | −0.1324 |
| 9 | 0.0000 | 0.0002 | 0.0007 | 0.1594 | 0.5695 |
| 10 | 3.1335 | −0.7222 | 0.1664 | 0.3209 | −0.1123 |
| Σ | 0.8972 | −0.0018 | −0.0205 | 0.1730 | 0.1521 |

The excellent optical properties and aberration compensation of the lens system set forth in Table I are illustrated in the graphs shown in FIGS. 2a, 2b and 2c.

A second specific embodiment of a retrofocus type objective lens system in accordance with the present invention is shown in the following Table III in which the designations are similar to those of the first specific embodiment.

TABLE III

| f=1.0 1:2.8 radius of curvature | field angle 2ω=64° thickness on axis | backfocus s'=1.06 refractive index | Abbe's number |
|---|---|---|---|
| r1 = 2.5414 | | | |
| r2 = 0.4915 | d1 = 0.0469 | N1 = 1.5725 | v1 = 57.5 |
| r3 = 0.6600 | d2 = 0.3284 | | |
| r4 = −1.8698 | d3 = 0.3345 | N2 = 1.6968 | v2 = 55.6 |
| r5 = −0.4287 | d4 = 0.2722 | | |
| r6 = 2.1911 | d5 = 0.0428 | N3 = 1.7006 | v3 = 30.1 |
| r7 = −1.9373 | d6 = 0.0376 | | |
| r8 = −0.4795 | d7 = 0.067 | N4 = 1.7495 | v4 = 50.1 |
| r9 = 4.3712 | d8 = 0.0029 | | |
| r10 = −1.1652 | d9 = 0.068 | N5 = 1.6214 | v5 = 61.3 |

In the last embodiment, as well,
$d_5 + d_6 + d_7 + d_8 + d_9 = 0.0428 + 0.0376 + 0.067 + 0.0029 + 0.068$ $d_5 + d_6 + d_7 + d_8 + d_9 = 0.2183 < 0.2722 = d_4$ thus satisfying the condition (a). Furthermore, $$\frac{d_3}{d_4} = 1.232$$

thus satisfying the condition (b). Furthermore, $$\frac{r_3}{r_4} = \frac{0.6600}{-1.8698} = -0.353$$

thus satisfying the condition (c). Still further, $N_1 = 1.5725 < N_3 = 1.7006$ thus satisfying the condition (d). Additionally, $d_2 = 0.3284 > 0.2$ thus satisfying the condition (e).

Seidel's coefficients at the respective refracting surfaces of the aforesaid second embodiment set forth in Table III are shown in the following Table IV:

TABLE IV

| surface | spherical aberration | coma | astigmatism | Petzval sum | distortion |
|---|---|---|---|---|---|
| 1 | 0.0141 | 0.02858 | 0.0577 | 0.1432 | 0.4069 |
| 2 | −8.8585 | 1.2967 | −0.1898 | −0.7407 | 0.1362 |
| 3 | 11.8527 | 0.3852 | 0.0125 | 0.6221 | 0.0206 |
| 4 | 2.1255 | −1.3671 | 0.8793 | 0.2196 | −0.7068 |
| 5 | −10.9140 | 2.2181 | −0.4508 | −0.9608 | 0.2869 |
| 6 | −1.6166 | −1.3646 | −1.1518 | −0.1880 | −1.1310 |
| 7 | 0.1295 | 0.2877 | 0.6391 | −0.2211 | 0.9286 |
| 8 | 5.1230 | −0.7390 | 0.1066 | 0.8935 | −0.1442 |
| 9 | −0.0001 | 0.0040 | −0.1058 | 0.0876 | 0.4808 |
| 10 | 3.2265 | −0.7520 | 0.1753 | 0.3289 | −0.1175 |
| Σ | 1.0820 | −0.0026 | −0.0275 | 0.1843 | 0.1604 |

The excellent optical properties and aberration compensation of the lens system set forth in Table III are illustrated in the graphs shown in FIGS. 3a, 3b and 3c.

The aforesaid condition (a) affords to the second lens G2 the function of positively compensating for coma, distortion, etc. which are created due to the first lens G1 of the single divergent system. If the air spacing d4 between the second lens G2 and the third lens G3 is added to the value exceeding the upper or lower limit value of the condition (a), there will result an abrupt decrease in the compensating function, whereby there will be imposed a limitation on the refractive index of the first lens or the selection of the thickness of the lens so as to decrease coma or distortion.

In addition, since coma and the like are compensated for by means of lenses subsequent to the third lens, the freedom in the configuration of the lenses subsequent to the third lens will be lost or the number of those lenses has to be increased.

The condition (b) defines the thickness of the second lens G2 to a desired range with respect to the aforesaid air spacing $d4$, whereby the combined or multiplicated actions of the functions of the second lens G2 according to the condition (b) and the function of the second lens G2 according to the aforesaid condition (a) may well compensate for aberrations.

If the thickness $d3$ of the second lens G2 is smaller than that of the lower limit of the condition (b), then there will be an abrupt increase in the lateral chromatic aberration at the corner portions of the image surface, while the balance of coma will be lost over the entire surface of the image, thereby losing the sphero achromatic characteristic. On the other hand, if the thickness $d3$ exceeds the upper limit, then there will remain a negative distortion which will not allow for its compensation.

The condition (c) defines the relationship of the radii of curvatures $r3$ and $r4$ of the second lens having convex surfaces on both sides, thereby optimizing the compensating function for coma, of the second lens G2, while maintaining minimized spherical aberration created due to the second lens G2. In other words, if the upper limit is exceeded, the spherical aberration produced thereby may not be compensated for by the third lens G3. If the lower limit is exceeded, then external coma is produced due to the second lens G2 as well as the third lens G3. However, this coma may not be compensated for by the other three lenses.

The condition (d) defines the relationship of the refractive indexes of the first lens G1 and the third lens G3, to thereby minimize the Petzval sum of the entire lens system, with the attendant good image surface. If the aforesaid condition (d) is not followed, there will result an increase in the halo component, although the Petzval sum may be reduced, thus impairing the contrast of the image materially, such that the performance of the entire lens system will be lowered at the time of the diaphragm being released.

The condition (e) defines an air spacing between the first lens G1 and the second lens G2, thereby limiting the second lens so as not to be over-biased forwardly. This condition (e) maintains the backfocus longer than 0.9 times as long as the focal length '$f$' of the entire lens system. If this condition is not followed, then there will be created considerable internal coma in the lens system, thus failing to meet practical application standards.

It should be appreciated that the present invention is by no means limited to the aforesaid two embodiments, but presents a retrofocus type objective lens system of five components, five lenses, which consists of a first lens of a negative meniscus, a second lens having convex surfaces on its both sides, a third lens having concave surfaces on its both sides, a fourth lens of a positive meniscus and having its convex surface facing the image side, and a fifth positive lens, and which system satisfies the aforesaid conditions (a) to (e), thereby presenting a long backfocus and being well compensated for the various aberrations.

It will be understood that the above description is merely illustrative of preferred embodiments of the invention. Additional modifications and improvements utilizing the discoveries of the present invention can be readily anticipated by those skilled in the art from the present disclosure, and such modifications and improvements may fairly be presumed to be within the scope and purview of the invention as defined by the claims that follow.

I claim:

1. A retrofocus objective lens system comprising a negative meniscus front first lens having a concave rear face, a biconvex second lens, a biconcave third lens, a positive meniscus fourth lens with a convex rear face, and a positive fifth lens, said lens system satisfying the following conditions:

$$1.6 \ (d_5 + d_6 + d_7 + d_8 + d_9) >$$
$$d_4 > d_5 + d_6 + d_7 + d_8 + d_9 \ \ 0.7d_4 < d_3 < 1.3d_4$$

$$-0.5 < \frac{r3}{r4} < -0.1$$

wherein $r_j$ is the radius of curvature of the jth lens face successively designated from the front lens face, and $d_j$ is the axial distance between the jth and the $j+1$ lens faces of the lens system.

2. A retrofocus type objective lens as set forth in claim 1, wherein the arrangement and construction of the five lenses are as follows:

| f=1.0 1:2.8 radius of curvature | field angle 2ω=64° length on axis | backfocus s'=1.06 refractive index | Abbe's number |
|---|---|---|---|
| r1 = 2.3437 | | | |
| r2 = 0.4709 | d1 = 0.0441 | N1 = 1.5714 | v1 = 53.0 |
| r3 = 0.6206 | d2 = 0.3538 | | |
| r4 =−1.8643 | d3 = 0.28 | N2 = 1.6583 | v2 = 58.5 |
| r5 =−0.4012 | d4 = 0.3182 | | |
| r6 = 2.3930 | d5 = 0.0379 | N3 = 1.6889 | v3 = 31.2 |
| r7 =−1.4595 | d6 = 0.0283 | | |
| r8 =−0.4496 | d7 = 0.067 | N4 = 1.7200 | v4 = 50.3 |
| r9 = 2.4019 | d8 = 0.0029 | | |
| r10=−1.1931 | d9 = 0.068 | N5 = 1.6204 | v5 = 60.3 | wherein Vi is the Abbe's number of the ith lens.

3. A retrofocus type objective lens system set forth in claim 1, wherein the arrangement and construction of the five lenses are as follows.

| f=1.0 1:2.8 radius of curvature | field angle 2ω=64° length on axis | backfocus s'=1.06 refractive index | Abbe's number |
|---|---|---|---|
| r1= 2.5414 | | | |
| r2= 0.4915 | d1 = 0.0469 | N1 = 1.5725 | v1 = 57.5 |
| r3 = 0.6600 | d2 = 0.3284 | | |
| r4=−1.8698 | d3 = 0.3345 | N2 = 1.6968 | v2 = 55.6 |
| r5=−0.4287 | d4 = 0.2722 | | |
| r6=2.1911 | d5 = 0.0428 | N3 = 1.7006 | v3 = 30.1 |
| r7=−1.9373 | d6 = 0.0376 | | |
| r8=−0.4795 | d7 = 0.067 | N4 = 1.7495 | v4 = 50.1 |
| r9=4.3712 | d8 = 0.0029 | | |
| r10=−1.1652 | d9 = 0.068 | N5 = 1.6214 | v5 = 61.3 |

Wherein Vi is the Abbe's number of the ith lens.

\* \* \* \* \*

UNITED STATES PATENT AND TRADEMARK OFFICE
CERTIFICATE OF CORRECTION

PATENT NO. : 3,936,153
DATED : February 3, 1976
INVENTOR(S) : Toshinobu Ogura

It is certified that error appears in the above—identified patent and that said Letters Patent are hereby corrected as shown below:

Claim 1, lines 7 and 8: Delete and substitute the following:

-- $1.6 (d_5+d_6+d_7+d_8+d_9) > d_4 > d_5+d_6+d_7+d_8+d_9$ $0.7 d_4 < d_3 < 1.3 d_4$ --

Signed and Sealed this eighth Day of June 1976

[SEAL]

Attest:

RUTH C. MASON
Attesting Officer

C. MARSHALL DANN
Commissioner of Patents and Trademarks